UNITED STATES PATENT OFFICE.

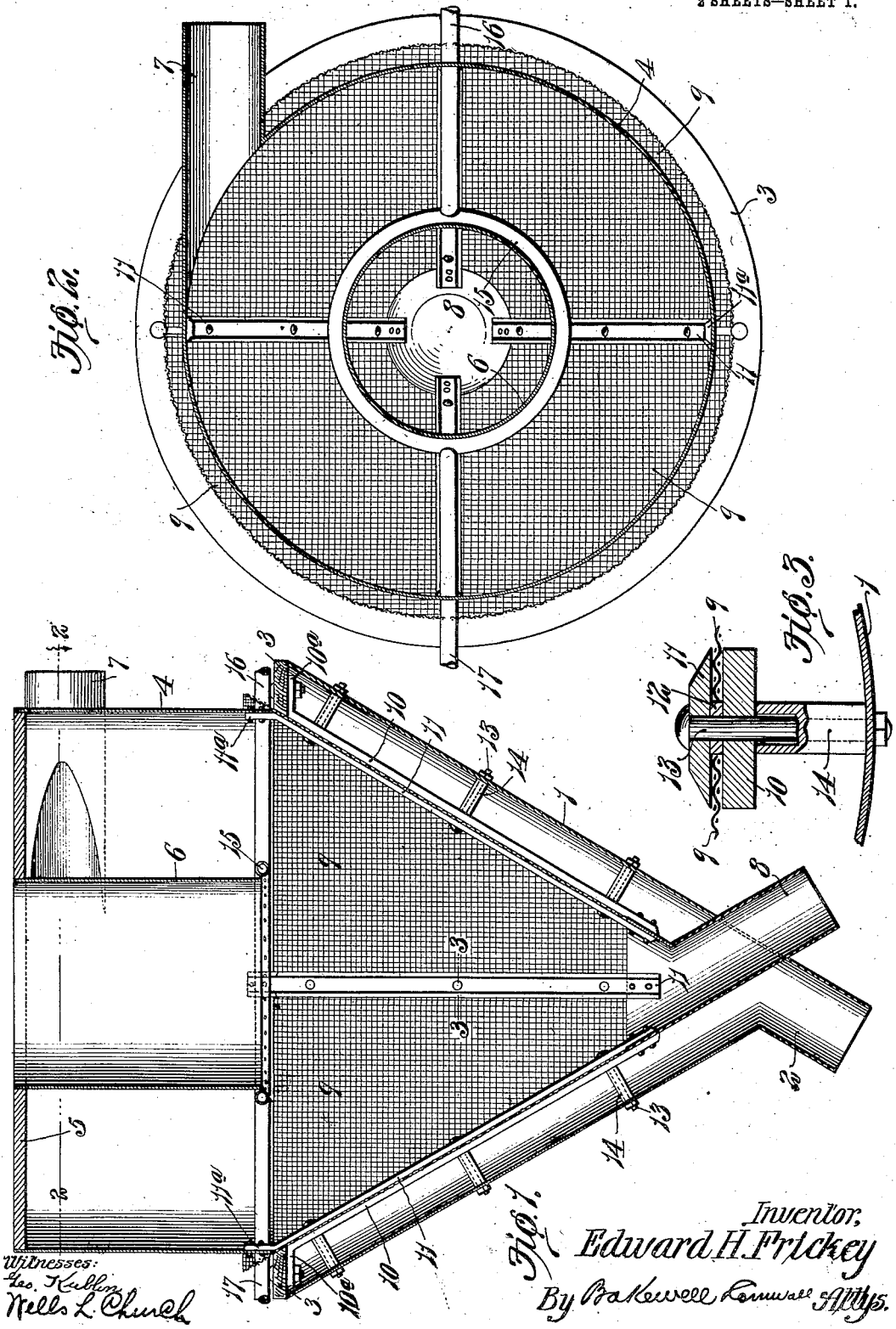

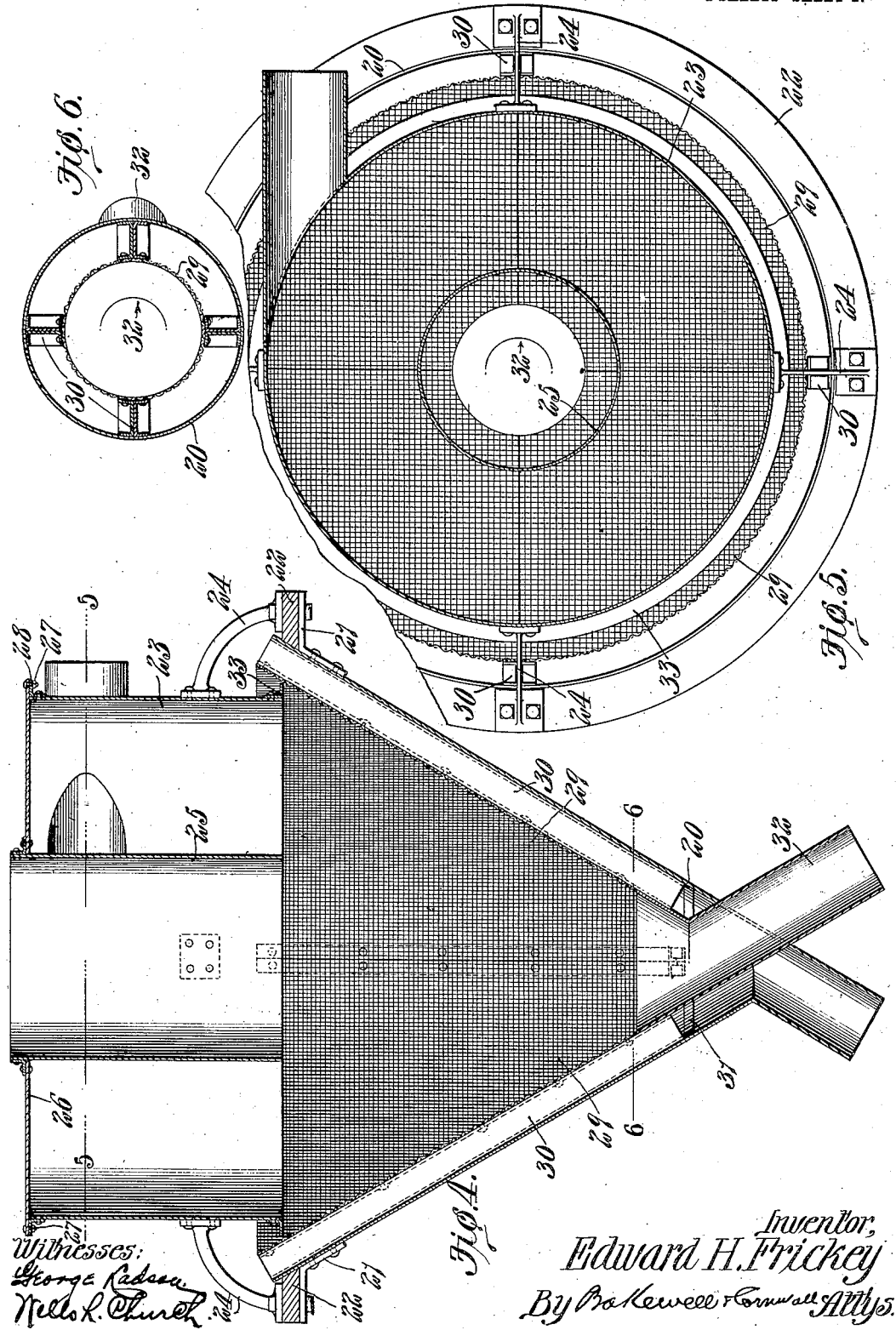

EDWARD H. FRICKEY, OF ST. LOUIS, MISSOURI, ASSIGNOR TO WILLIAMS PATENT CRUSHER & PULVERIZER COMPANY, OF ST. LOUIS, MISSOURI, A CORPORATION OF MISSOURI.

DUST COLLECTOR AND SEPARATOR.

938,656.      Specification of Letters Patent.     Patented Nov. 2, 1909.

Application filed May 18, 1908. Serial No. 433,547.

*To all whom it may concern:*

Be it known that I, EDWARD H. FRICKEY, a citizen of the United States, residing at St. Louis, Missouri, have invented a certain new and useful Improvement in Dust Collectors and Separators, of which the following is a full, clear, and exact description, such as will enable others skilled in the art to which it appertains to make and use the same, reference being had to the accompanying drawings, forming part of this specification, in which—

Figure 1 is a vertical sectional view of a dust collector and separator constructed in accordance with my invention; Fig. 2 is a horizontal cross sectional view taken on the line 2—2 of Fig. 1; Fig. 3 is an enlarged cross sectional view taken on the line 3—3 of Fig. 1; Fig. 4 is a vertical sectional view of a modified form of my invention; Fig. 5 is a cross sectional view taken on the line 5—5 of Fig. 4; and Fig. 6 is a cross sectional view taken on the line 6—6 of Fig. 4.

This invention relates to dust collectors and separators, and particularly to that type which are commonly termed cyclone dust collectors.

The main object of my invention is to provide a dust collector and separator having a screening member composed of a number of removable sections which are held in operative position in a novel manner.

Another object of my invention is to provide a dust collector and separator comprising a casing having its lower end contracted, means for introducing a current of dust-laden air into said casing, and means for introducing a spray into said casing to moisten the air and cause the fine particles of dust in the air to settle.

Other objects and desirable features of my invention will be hereinafter pointed out.

Referring to Figs. 1 to 3 of the drawings which illustrate one form of my invention, 1 designates an inverted conical-shaped casing provided at its lower end with a discharge chute 2 and having its upper edge butting against a ring-shaped supporting member 3. The upper portion of the casing consists of a cylindrical-shaped member 4 provided with a closed top 5, the lower edge of said cylindrical-shaped member 5 terminating adjacent the ring-shaped supporting member 3. A tube 6 is arranged inside of the member 4 and projects through the top 5 thereof to form a discharge conduit for the air from which the dust has been removed, and a feed pipe 7 extends tangentially into the cylindrical-shaped member 4, as shown in Fig. 2, for introducing a current of dust-laden air into the casing, the air whirling around the inside of the casing and then passing upwardly through the discharge conduit 6.

A screening member is arranged inside of the inverted conical-shaped portion of the casing and is spaced away therefrom so that the fine particles of dust in the air can pass through said screening member into the discharge pipe 2 at the lower end of the casing, the coarse particles of dust in the air sliding down the screening member to a discharge conduit 8 at the lower end of same. This screening member forms one of the novel features of my invention and consists of a number of removable sections 9 of perforated material, the screening member herein shown being composed of four wedge-shaped sections which are slidingly mounted in guideways. Each of said guideways consists of a bar 10 provided at its upper end with a flange 10ª that is connected to the underneath side of the ring-shaped supporting member 3, and a top bar 11 mounted on the bar 10 and spaced away therefrom by a filler 12 so that each guideway is provided with two grooves or slots that receive the edge portions of two of the screen sections 9. The bars 10 and 11 which form a guideway are connected together by bolts 13 that pass through said bars and the filler 12 and also through spacing sleeves 14 that are arranged between the bar 10 and the inside face of the inverted conical-shaped portion 1 of the casing, as shown in Figs. 1 and 3. These inclined guides thus form the supporting means for the lower portion 1 of the casing, and the cylindrical-shaped member 4, which forms the upper portion of the casing, is connected to vertically disposed extensions 11ª on the top bars 11 of the guideways. The upper edge portion of the discharge chute 8 of the screening member is clamped between the bars 10 and 11 so that the upper edge of said chute forms a stop for the sections 9 of the screening member. The lower edge of the cylindrical-shaped member 4 of the casing is spaced far enough from the ring-shaped supporting member 3 to form a slot through which the upper ends of the screen sections 9 extend, as shown in Fig. 1, so as to enable said sections to be grasped and pulled upwardly out of their guideways when it is desired to use a screening member of a different mesh or when said sections have worn out.

A perforated pipe 15 surrounds the lower end of the air discharge tube 6 for introducing a spray into the casing so as to moisten the air and thus cause the very fine particles of dust in the air to settle instead of passing out of the discharge tube 6. The fluid, which can either be steam or water, is conducted to said perforated pipe by an inlet pipe 16 and the fluid which does not pass through the openings in said perforated pipe is conducted away therefrom by means of an outlet pipe 17.

A perforated pipe 15 is purposely located immediately around the lower end of the air discharge tube 6, in order that the spray discharging from the perforations in said pipe 15 will moisten the air and the fine particles of dust carried thereby at the time said air passes into the discharge pipe, and thereby practically all of the dust is removed or separated from the air discharging from the casing.

Figs. 3 to 6, inclusive, illustrate a modified form of my invention wherein the inverted conical-shaped member 20 that forms the lower portion of the casing is connected by brackets 21 to a ring-shaped supporting member 22. The cylindrical-shaped member 23 that forms the upper portion of the casing is fastened to brackets or arms 24 on the ring-shaped supporting member 22, and the tube 25 that projects into the upper portion of the casing to form a discharge conduit for the air from which the dust has been removed, is connected to the removable top 26 of the cylindrical-shaped member, said top being detachably connected by fastening devices 27 to a flange 28 on the upper edge of the member 23.

The screening member which is arranged inside of the casing is made up of a number of sections 29 of perforated material. The side edge portions of each of the screen sections 29 are connected to two members 30 that rest upon the inside face of the inverted conical-shaped member 20, and said member 20 is preferably provided adjacent its lower end with a ring or projection 31 that forms a stop or abutment for the members 30 and thus holds the screen sections in operative position. I prefer to use members 30 of approximately channel-shape in cross section, said members being set edgewise so that their webs are disposed vertically. The flanges or legs of each pair of members 30 project toward each other so that the outside faces of the vertical webs of one pair of members 30 will bear against the outside faces of the vertical webs of the members 30 to which the adjacent screen sections are connected. The screen sections are connected to the upper legs or flanges of the members 30 and the side edges of the screen sections butt against each other so that a perfectly smooth screening member is produced with no projections or ridges between the various sections of said screening member. The discharge chute 32 of the screening member is provided at its upper end with a flared flange that rests freely upon portions of the members 30 that project below the screen sections secured to said members, and the cylindrical-shaped member 23 which forms the upper portion of the casing is provided at its lower edge with a flange 33 that bears upon the inside face of the screening member, as shown in Fig. 4. The screen sections and the supporting members 30 to which said screen sections are connected project beyond the lower edge of the cylindrical-shaped member 23 so that said members 30 can be grasped and pulled upwardly out of the casing when the screen sections have worn out or it is desired to use a screen of different mesh.

Having thus described my invention, what I claim as new and desire to secure by Letters Patent is:

1. A dust collector and separator, comprising a funnel-shaped casing, stationary guideways secured to the lower portion of the casing on the interior thereof, which guideways are spaced away from the wall of the casing, and a screening member composed of a series of removable sections, the side edges of which sections are slidingly mounted in the guideways.

2. An apparatus of the character described, provided with an inverted conical-shaped casing, a screen supporting frame arranged inside of said casing and consisting of a number of grooved guideways, a plurality of sections of perforated material slidingly mounted in said guideways, a supporting device to which said guideways are connected, and means connected to said guideways for supporting the casing; substantially as described.

3. An apparatus of the character described, provided with a plurality of inclined guideways, each of which consists of a pair of bars spaced away from each other to form slots, sections of perforated material slidingly mounted in said slots, and a discharge chute having its upper edge portion arranged between said pairs of bars and connected thereto; substantially as described.

4. An apparatus of the character described having a casing which consists of a cylindrical-shaped upper portion, a lower portion of greater diameter than said upper portion, and a screening member arranged inside of the lower portion of the casing and consisting of a number of slidingly mounted sections, the upper ends of which terminate above the lower edge of the upper portion of the casing; substantially as described.

5. An apparatus of the character described, provided with a casing which consists of an upper portion and a lower portion, guideways arranged inside of the lower portion of the casing, and screen sections slidingly mounted in said guideways and having their upper ends terminating outside of said casing; substantially as described.

6. An apparauts of the character described, comprising a casing which consists of an inverted conical-shaped lower portion and a cylindrical-shaped upper portion of less diameter than said lower portion, inclined guideways arranged inside of the lower portion of the casing, removable screen sections slidingly mounted in said guideways and terminating beyond the lower edge of the upper portion of the casing, and a flange at the upper edge of the lower portion of the casing which coöperates with the upper portion of the casing to form a slot through which said screen sections pass; substantially as described.

7. An apparauts of the character described, comprising a ring-shaped supporting member, a plurality of inclined bars connected to said supporting member, clamping bars arranged above said bars and spaced away therefrom to form guideways, removable screen sections slidingly mounted in said guideways, extensions on the upper ends of said clamping bars, a cylindrical-shaped member connected to said extensions to form the upper portion of a casing, and an inverted conical-shaped member connected to said guideways to form the lower portion of the casing; substantially as described.

8. In an apparatus of the class described, a casing, an air discharge pipe leading from the upper end thereof, means for introducing a current of dust-laden air into said casing, and a spray pipe arranged around the extreme lower end of the air discharge pipe, the apertures in which spray pipe are so formed as to throw the jets discharging from said pipe to the center of the air discharge pipe.

9. In an apparatus of the class described, a casing having a closed top, an air discharge pipe leading from said top, a pipe for leading a current of dust-laden air into said casing, a sectional screen inside said casing, the sections of which are movable, a perforated pipe surrounding the lower end of said air discharge pipe, the perforations in which pipe are so formed as to throw the jets discharging from said pipe to the center of said air discharge pipe.

10. A dust collector and separator, comprising an approximately conical-shaped stationary casing, slotted guideways arranged inside of said casing and spaced away therefrom, and a screening member consisting of wedge-shaped pieces of perforated material slidingly mounted in said guideways; substantially as described.

11. A dust collector and separator, provided with a casing that consists of a lower portion and an upper portion, and a screen arranged in the lower portion and consisting of removable sections that pass between the upper and lower portions of the casing and terminate outside of same; substantially as described.

12. A dust collector and separator, provided with a casing that comprises an inverted conical-shaped lower portion, a cylindrical-shaped upper portion that projects into the upper end of same, and removable screen sections arranged in said lower portion and having their upper ends terminating outside of the upper portion of the casing; substantially as described.

13. A dust collector and separator, comprising an approximately ring-shaped supporting member, a number of inclined guideways depending from said member and securely connected thereto, wedge-shaped screen sections slidingly mounted in said guide-ways, and a casing surrounding said screen sections and supported by said guideways; substantially as described.

14. A dust collector and separator, provided with a casing which consists of a stationary upper and lower portion that are spaced away from each other slightly so as to form a slot between their adjacent edges, stationary guides in the lower portion of the casing, and removable screen sections slidingly mounted in said guides and passing through the slot between the edges of the two portions of the casing; substantially as described.

15. A dust collector and separator, comprising a supporting member, inclined guideways connected to said supporting member and carried by same, a casing consisting of an upper portion and a lower portion carried by said guideways and having their adjacent edges spaced away to form a slot between same, and screen sections slidingly mounted in said guideways and passing through said slot; substantially as described.

In testimony whereof I hereunto affix my signature in the presence of two witnesses, this thirteenth day of May 1908.

EDWARD H. FRICKEY.

Witnesses:
MILTON F. WILLIAMS,
GEORGE BAKEWELL.